July 3, 1934.  H. J. BURNISH  1,965,368

STRAINER

Filed Aug. 4, 1932  2 Sheets-Sheet 1

INVENTOR
H. J. Burnish
by J. N. Barber
Attorney

July 3, 1934.   H. J. BURNISH   1,965,368
STRAINER
Filed Aug. 4, 1932   2 Sheets-Sheet 2
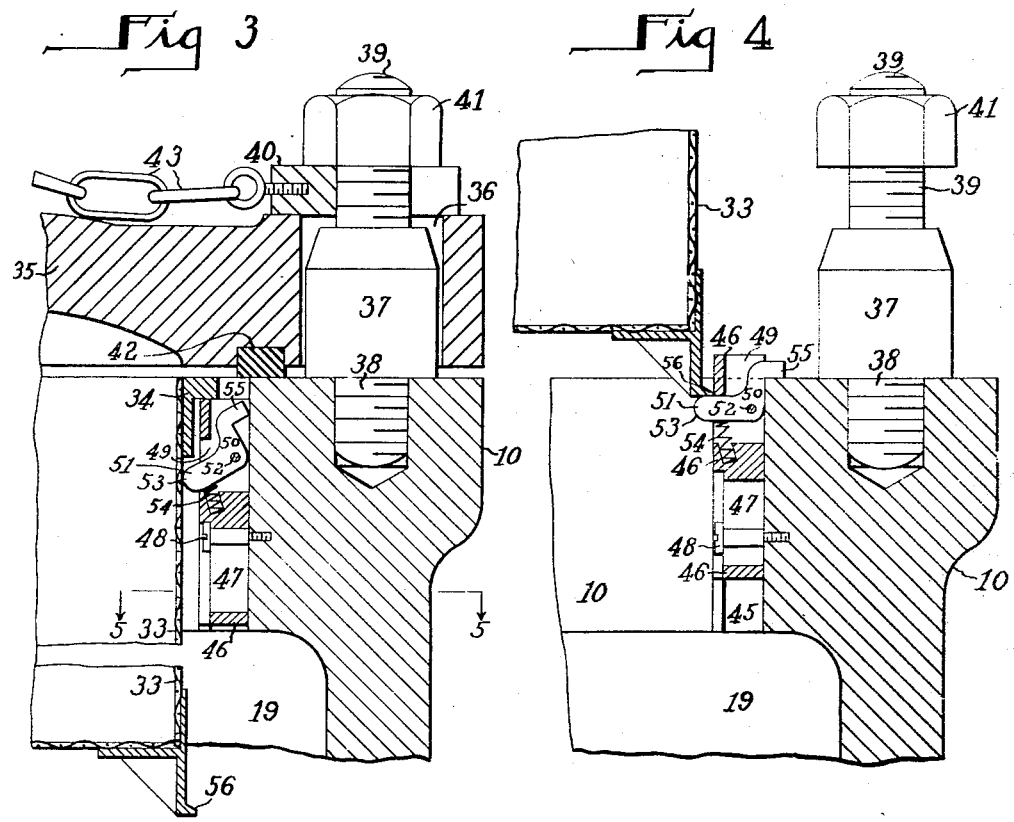
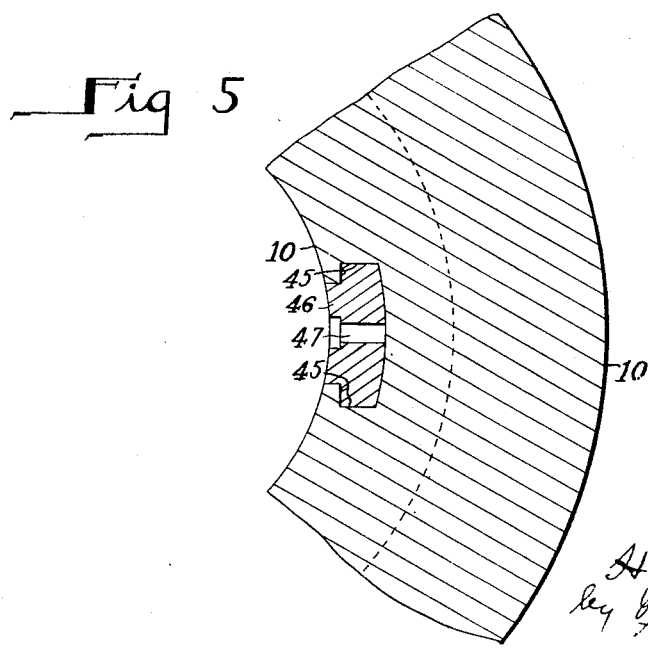
INVENTOR
H. J. Burnish
by F. N. Barber
attorney Patented July 3, 1934

1,965,368

UNITED STATES PATENT OFFICE 1,965,368

STRAINER

Howard J. Burnish, Sewickley, Pa., assignor to Spang, Chalfant & Co., Inc., Pittsburgh, Pa., a corporation of Pennsylvania Application August 4, 1932, Serial No. 627,436

4 Claims. (Cl. 210—168)

My invention relates to strainers.

One object of this invention is to provide means whereby when the cover therefor and a screen basket therein has been removed, the cover cannot be reseated until after the basket has been replaced. Other objects appear hereinafter.

Figure 1:
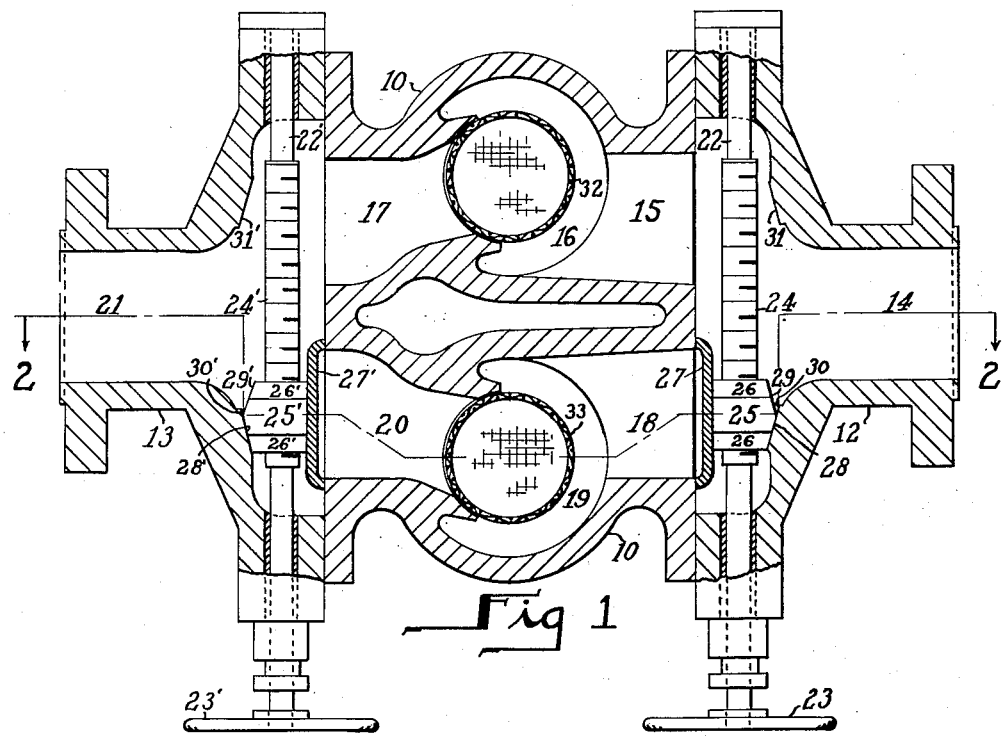
Figure 2:
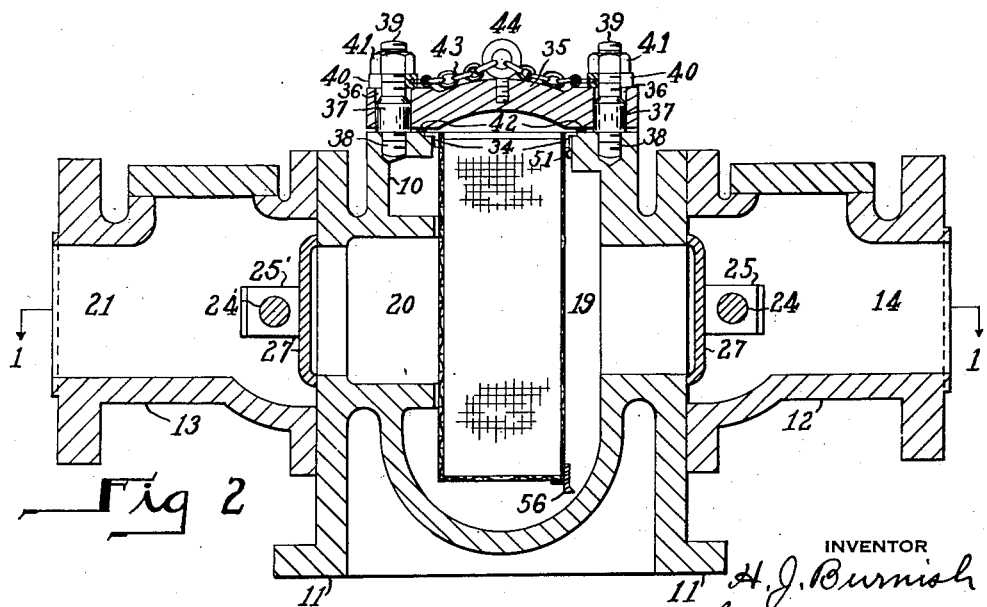

Referring to the accompanying drawings, Fig. 1 is a central horizontal section of one of the forms which my invention may assume, the section being taken on the line 1—1 on Fig. 2; Fig. 2, a section taken on the broken line 2—2 on Fig. 1; Fig. 3, an enlarged section of a portion of Fig. 2 showing the safety latch with the screen basket in working position, Fig. 4, a section similar to that in Fig. 3, but with the cover removed and the screen basket ready for replacement; and Fig. 5, a section on the line 5—5 on Fig. 3.

The casing of my improved strainer comprises a central member 10 supported by the flanged base 11, and the two inlet and outlet members 12 and 13, secured to the opposite sides of the member 10 by any suitable means.

Fluid flows through the inlet passage 14 in the casing member 12, whence it may flow through the central casing member 10 by one or the other of two courses, one course being by way of the inlet passage 15, the large vertical chamber 16 and the outlet passage 17, and the other course being by way of the inlet passage 18, the large vertical chamber 19 and the outlet passage 20. The outlet passage 21 in the casing member 13 receives the fluid from one or the other of the outlet passages 17 and 20 in the central casing member.

The casing member 12 has the rotary non-traveling shaft 22 operated by the hand-wheel 23. The shaft lies in front of the passages 15 and 18 and has the threaded section 24 working in the non-rotary nut 25 embraced on opposite sides by the ears 26 integral with the slide-valve 27, shown as closing the inlet port of the passage 18. By suitably rotating the shaft 22, the threaded section 24 will cause the nut to move the valve 27 so that it will close the inlet port of the passage 15. The outer face of the nut has the opposite inclines 28 and 29, the former to coact with the incline 30 in the member 12 to wedge the valve tightly on its seat around the port to the passage 18. The latter incline 29 is adapted to engage the incline 31 in the member 12 and wedge the valve fluid tight on its seat around the port of the passage 15.

The casing member 13 has parts identical with those just described and the parts in the member 13 bear the same reference numerals as the parts in the casing member 12 except that the numerals in the member 13 are provided with prime marks. The valve 27' is shown closing the outlet port of the passage 20, but it may be made to close the outlet port of the passage 17 by suitably rotating the hand-wheel 23'.

The chambers 16 and 19 contain the respective vertical cylindrical screen baskets 32 and 33 standing in contact with the inlet ports of the respective passages 17 and 20. The faces of these ports are made arcuate so as to fit the contacting portions of the baskets, as shown in Fig. 1, so that no fluid can by-pass the baskets. The passage of fluid through the baskets seats them tightly against the inlet ports of the outlet passages 17 and 20.

Each basket has at its upper end an external flange 34 by which it is supported on the member 10.

The upper end of the casing member 10 has the cover 35 with the large holes 36 to receive the large studs 37 connected to the member 10 by smaller screw extensions 38 in the upper edge of the said member. The upper ends of the studs are tapered upwardly to facilitate the replacements of the cover. They are provided with the reduced upward threaded extensions 39. U-shaped members 40 are placed astride the extensions 39 and upon the cover 35, the nuts 41 being applied to the extensions 39 to clamp the cover to the casing member 10 and to clamp the U-shaped member tightly between the cover and the nuts. A gasket or packing 42 is placed between the cover and the member 10 to seal the joint between the same. Chains 43 or the like are connected to an eye 44 on the cover and to the U-shaped members 40 to prevent the loss of the latter.

A safety latch is associated with one or both chambers 16 and 19 and their screen baskets 32 and 33, but I have shown only one latch and that applied to the inner wall of the chamber 19 only. This wall is provided with a vertical dove-tail groove 45 (Fig. 5) in which a vertically-movable block or slide 46 travels. The lower portion of the slide has the vertical slot 47 to receive the screw 48 screwed into the member 10 and serving to limit the up and down travel of the slide. The upper end of the slide has the slot 49, in which the upstanding member 50 of the latch 51 stands, the latch being pivotal on the pin 52 in the slide 46. The latch has a lateral member or tail 53 which extends through a slot in the slide and toward the adjacent side of the screen or basket 33. The latch is urged by the spring 54 to rotate clockwise or so as to cause the lateral lug or catch 55 on the outer edge of the latch to snap over and lie upon the upper edge of the member 10 when the slide 46 has been lifted sufficiently, as shown in Fig. 4.

When the screens are in their proper places and the cover is properly secured, the parts are as in Figs. 2 and 3. The slide 46 is in its lowest position and the latch is tilted with its lug 55 urged against the inner wall of the member 10 by the spring 54.

When the screen is to be removed, the nuts 41 are merely loosened, the U-shaped members 40 are pulled away from the stud-extensions 39 and the cover 35 is removed. When the screen 33 is pulled up nearly out of the chamber 19, the foot or toe 56 pendent from the lower end of the screen and directly below the tail 53 of the latch engages the under side of the tail and causes the block 46 and the latch to move upwardly from the positions shown in Fig. 3 until the lower end of the slot 47 engages the stop screw 48. At that time the latch will have its lug 55 above the top of the casing member 10, and due to the action of the spring 54 and the foot 56, the latch will rotate clockwise causing the lug 55 to lie directly on the top of the member 10 as clearly shown in Fig. 4. At this time the bottom of the screen 33 is above the member 10 and may be moved laterally to free the foot 56 from the latch so that the screen may be taken away.

It will be impossible to replace the cover 35 until the latch 51 and the block 46 have been lowered to the positions shown in Fig. 3. When a screen is to be replaced into the chamber, the screen is lowered so that the foot 56 rests on the tail 53 of the latch, as shown in Fig. 4. The weight of the screen rotates the latch anticlockwise and causes the slide 46 together with the latch to descend into the top wall of the casing member 10. By moving the bottom of the screen laterally to the left in Fig. 4, the foot 56 can be lowered so as to be replaced beneath the tail 53 and allow the screen to be lowered to its normal position, as shown in Fig. 2.

I have presented a strainer for fluids, to which its cover cannot be applied when its screen basket has been removed. In Fig. 1, fluid may flow through the screen 32 while the screen 33 may be absent, since the valves 27 and 27' have closed all access of the fluid to the chamber 19. By moving the valves so that they seal the passages 15 and 17 and open the passages 18 and 20, fluid may go through the screen 33 while the screen 32 is absent.

I claim:—

1. In a strainer, a casing having inlet and outlet passages, a chamber in the casing and between the passages, a strainer basket insertable into the chamber through an opening in the casing, a removable cover connected to the casing and forming a seal for the opening, and means operated by the removal of the basket for interposing an obstruction to the replacement of the cover.

2. In a strainer, a casing having inlet and outlet passages, a chamber in the casing and between the passages, a strainer basket insertable into the chamber through an opening in the casing, a removable cover connected to the casing and forming a seal for the opening, and means operated by the removal of the basket for interposing an obstruction to the replacement of the cover and operated by the insertion of the basket into the casing for removing the obstruction.

3. In a strainer, a casing having inlet and outlet passages, a chamber in the casing and between the passages, a strainer gasket insertable into the chamber through an opening in the casing, a removable cover connected to the casing and forming a seal for the opening, a slidable block in the casing, a latch carried by the block below the cover and adapted upon the travel of the block to a predetermined point to be interposed in the path of the replacement of the cover, and means carried by the basket and adapted during the removal of the basket to cause the block to travel to the said point.

4. In a strainer, a casing having inlet and outlet passages, a chamber in the casing and between the passages, a strainer basket insertable into the chamber through an opening in the casing, a removable cover connected to the casing and forming a seal for the opening, a slidable block in the casing, a latch carried by the block below the cover and adapted upon the travel of the block to a predetermined point to be interposed in the path of the replacement of the cover, and means carried by the basket and adapted during the removal of the basket to cause the block to travel to the said point, the said means causing the removal of the latch from the said path upon the replacement of the basket.

HOWARD J. BURNISH.